(No Model.) 2 Sheets—Sheet 2.
DE LONSON E. BARNARD.
SAFETY DRIVING CLUTCH.
No. 565,415. Patented Aug. 4, 1896.
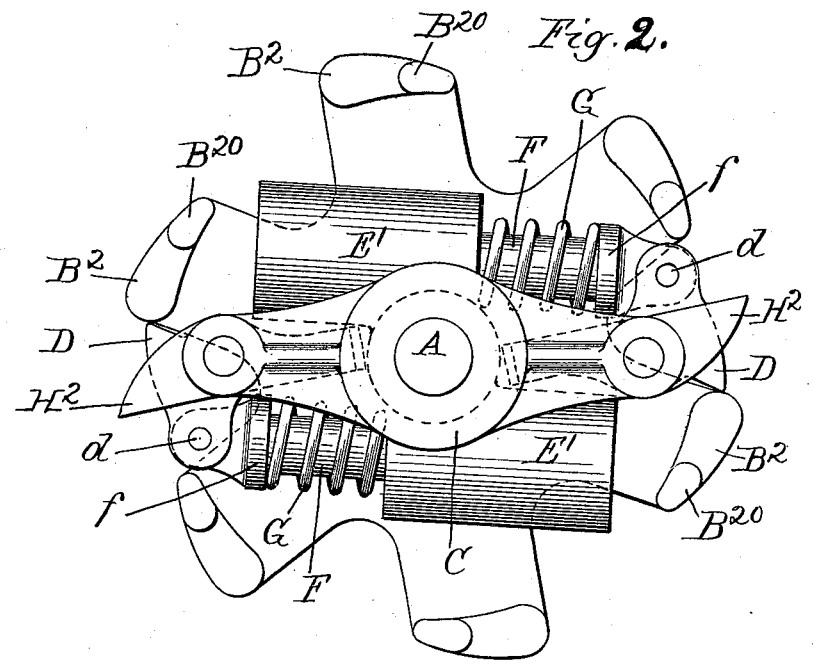
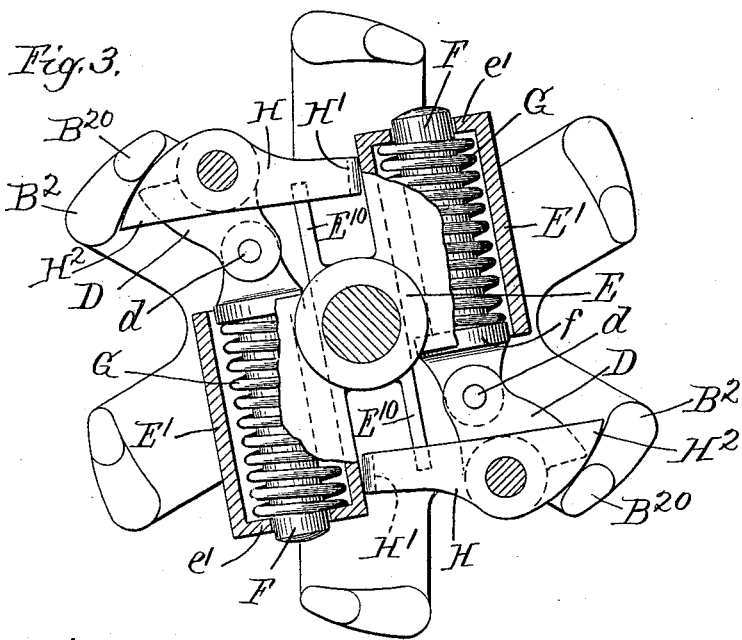
Witnesses.
E. T. Wray
Jean Elliott
Inventor.
D. Elmy Barnard
by Burton and Burton
his attys

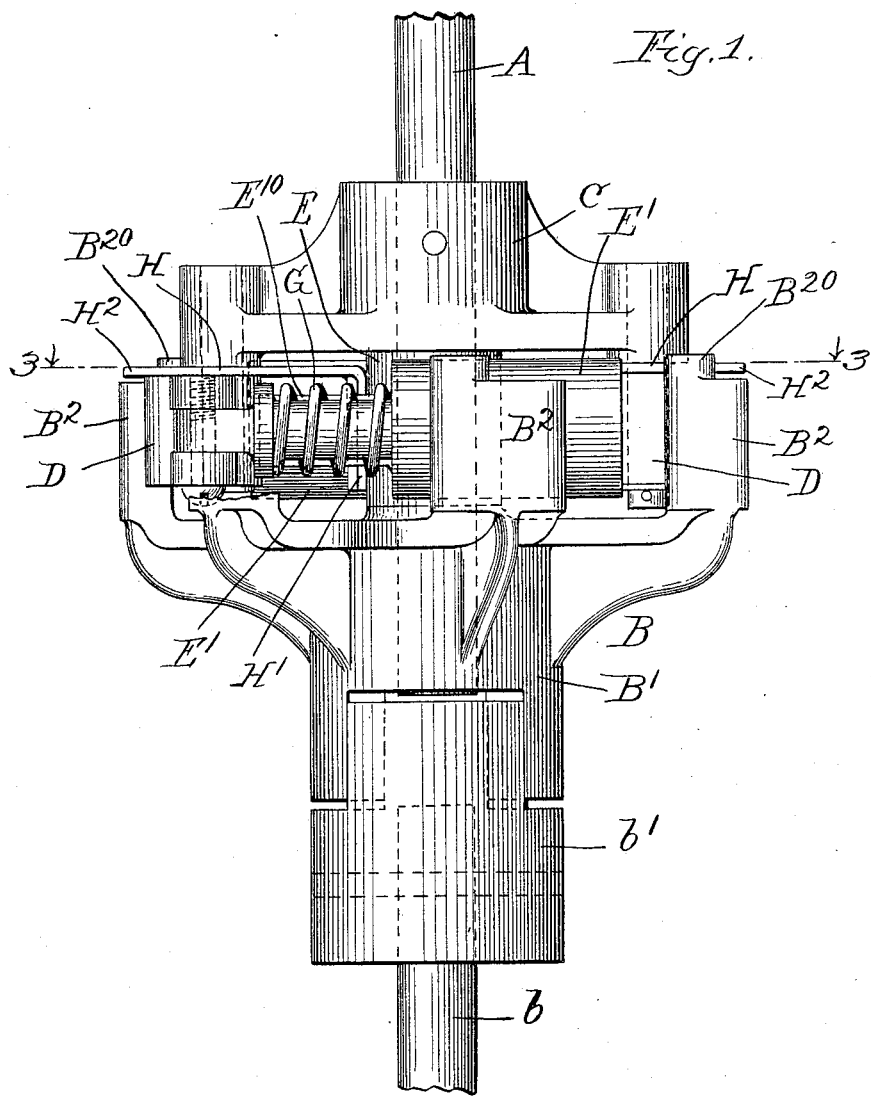

UNITED STATES PATENT OFFICE.

DE LONSON ELROY BARNARD, OF BELOIT, WISCONSIN.

SAFETY DRIVING-CLUTCH.

SPECIFICATION forming part of Letters Patent No. 565,415, dated August 4, 1896.

Application filed November 18, 1895. Serial No. 569,296. (No model.)

*To all whom it may concern:*

Be it known that I, DE LONSON ELROY BARNARD, a citizen of the United States, residing at Beloit, county of Rock, and State of Wisconsin, have invented certain new and useful Improvements in Safety Driving-Clutches, which are fully set forth in the following specification, reference being had to the accompanying drawings, forming a part thereof.

The purpose of this invention is to provide an improved clutch adapted to be interposed between a driving and a driven shaft and to automatically disengage when the resistance encountered exceeds a predetermined amount for which the clutch is adjusted.

In the drawings, Figure 1 is a plan view of my improved clutch, showing the shaft in section in driving position. Fig. 2 is a side elevation of the same. Fig. 3 is a section at the line 3 3 on Fig. 1, but showing the clutch disengaged and the spring-barrels broken partly away.

A is a driving-shaft.

B is a clutch-head or member of the clutch which is adapted to be fixed with respect to the driven shaft by its hub B', interlocked with the hub of the collar $b'$, secured to the driven shaft $b$ in the manner well understood.

The clutch-head B has one or more, preferably two at least, and, as illustrated, six, lugs or abutments $B^2$ projecting from its web in a direction parallel with the shaft and in a circle about said shaft.

C is a cross-head rigid with the shaft A, facing the driven clutch-head B. Connected to it at its opposite extremities on pivots parallel with the shaft are the driving-dogs D D. These dogs have their driving-faces adapted to stand substantially radial with respect to the shaft and to abut squarely against the edges of the abutments $B^2$ $B^2$, and in that position to drive the clutch-head B, when the shaft A revolves. They are also adapted to rock about their pivots to the position shown in Fig. 2, and when in that position they have no part which projects far enough to collide with any of the abutments, but they then revolve entirely within the circle of the said abutments, and therefore do not drive the clutch-head B, and the driven shaft is then at rest.

E is a lever or pivoted cross-head on the shaft A between the cross-head C and the clutch-head B and wholly within the circle of the abutments $B^2$.

E' E' are lever-arms of the cross-head E, which are tubular and have telescoped with them, respectively, the plungers F F, which are pivotally connected at $d$ $d$ to the heels of the dogs D D, respectively.

It may be understood that the rocking of the dogs D about their pivots on the cross-head C will tend to telescope the plungers F with the tubular lever-arms, respectively, and at the same time to rock the lever E on the shaft. The latter movement is the primary occasion for adopting the construction which involves the use of such lever E, as will hereinafter be explained; but the telescoping movement is taken advantage of to provide the yielding resistance to the dogs which shall cause them to drive the clutch-head until that resistance is overcome by the resistance of the work. This yielding resistance to the dogs is afforded by the springs G G, which are interposed between the two telescoping parts of the arms of the lever E, to wit, the tubular arm E' and the plunger F, respectively, the barrel of the tubular arm having a flange $g$, which stops one end of the spring, and the plunger having a flange $f$, which stops the other end.

With the parts thus far described, it will be understood that when the shaft is rotated with the dogs in the position shown in Fig. 1 the clutch-head B will also be rotated in the same direction to the same extent, but sufficient resistance to the rotation of the clutch-head being encountered by the driven shaft the dogs D will be rocked back over their pivots, forcing the plungers F through the springs G G, respectively, compressing the latter until the driving-faces of the dogs, which were radial at starting, become substantially tangential with respect to their own rotary movements with the shaft, and said dogs stand entirely within the circle of the abutments $B^2$ of the clutch-head, and therefore no longer drive the latter. It will be obvious also that so far as the parts already described affect the action there is nothing to prevent the dogs from being forced out to their original driving position by the reaction of the springs G G after passing the first abutment with which they were engaged and becoming engaged again with the next abutment in the circle and being forced back again, if the resistance to the rotation of the driven shaft still exists, and so on, flying out between the abutments and being forced back by each of them successively.

To obtain opportunity for introducing means to prevent the dogs from being thrown out into engaging position after passing each abutment and to cause them after being once forced back to remain out of engagement until the operator, having removed the obstruction encountered in the work, readjusts the clutch to driving position, is the purpose of providing the lever E and connecting it to the dogs in such manner that the swinging of the dogs on their pivots when crowded back by the abutments A' shall rock said lever E on the shaft, for such rocking movement of the lever, changing its position relatively to the cross-head, gives opportunity for locking it in such changed relation to the cross-head and thereby securing the dogs in the disengaged position. For this purpose I mount upon the pivots of each of the dogs upon the upper side of the latter and the under side of the cross-head latches H H, having each an arm A' bent down toward the clutch-head and extending, when the dogs are engaged in driving position, close alongside the hub of the lever E and adapted by rotation on their pivots through something less than ninety degrees to bear directly against the side of the lever-arms E' E', respectively, when the latter are in the position to which they are forced by the rocking back of the dogs, as seen in Fig. 2. In this position the pressure of the arms E' against the latch, due to the tension of the springs G G, operates directly toward the pivot of the latch, and therefore has no tendency to swing the latch, and the latter therefore positively locks the tubular arms E in that position. For the purpose of swinging the latches to this locking position I provide them with a tooth or finger $H^2$, which extends out over the dogs and is adapted to collide with the abutments $B^2$, which project above the upper edges of the dogs sufficiently for that purpose. In order to time the action of these latches with respect to the action of the dogs when thrown back by the resistance of the work, as described, I find it convenient to cut away the rear portion of the abutments at their upper ends, leaving a shoulder $B^{20}$, situated toward the forward limit of the abutment and facing rearward in the path of rotation, against which shoulder the projections $H^2$ of the latch collide after the dog has been forced back so that it is slipping past the abutment. At this stage it will be observed that the arms E' are as far from their stops on the cross-head as they can be carried by forcing back the dogs, and before the dogs run off from their abutments, by which they have thus been forced back, the fingers $H^2$ of the latches collide with the shoulders $B^{20}$ of the abutments, causing the latches to be swung about their pivots, bringing the bent end H' around to locking position against the sides of the arms E'. In addition to merely locking the dogs out of engaging position it is desirable to carry them a little farther than the abutments themselves will force them, so that their faces shall be taken entirely off from the abutments, so that as the driving-shaft continues to revolve the dogs shall not be dragging on the abutments and wearing off their faces and the abutments and making a disagreeable noise, and for that purpose I shape the projecting fingers $H^2$ of the latches so that they are not only swung into locking position and hold the arms E' to the point to which the latter are forced by crowding back of the dogs, but so that the latches by their ends H', which stop against the arms E', will themselves carry those arms a little farther in the same direction in which they were forced by the dogs and will thereby draw the dogs back a little farther from the abutments $B^2$.

By shaping the foot or bent end H' of the latch so that it will be just perceptibly divergent from the face of the arm E', against which it seats when in the position shown in Fig. 2, when the point of the latch is forced as far back as the abutments can force it, I obtain the result that the tension of the springs, which operates to press the said arm and foot together, will cause said foot to come to a position of square contact against the face of the arm, and the latch will thereby be swung about its pivot a little farther than the abutment on the clutch-head can force it, and its nose will thereby be carried inward out of contact with the abutment and will itself also revolve with the cross-head C without striking the abutments.

To reëngage the clutch, the operator will simply force the latches back from their seats against the sides of the arms E', whereupon the springs will restore the parts to the position of Fig. 1.

It will be noticed that the lever action of the lever E on the shaft A, about which it is fulcrumed, is produced by the sideward movement of the end toward the dog of the lever-arm E', the plunger F being virtually a part of the lever-arm and telescoping with it only to accommodate the movement of the pivot $d$ about the central pivot of the dog; that is to say, the pivot $d$ being at the engaged position of the dog in a radial line from the dog's pivot nearly at right angles to the axis of the spring and to the telescoping movement of the plunger F and tubular arm E', the inward movement of the dog as it is crowded back by the abutment $B^2$ tends mainly to compress the spring and telescope the plunger in the tubular arm; but as the dog swings farther around on its pivot and the pivot $d$ passes a point forty-five degrees from its starting-point its further movement tends mainly to swing the lever E on the shaft and only slightly to compress the spring farther, (except, however, that the said swinging of the lever on the shaft brings the stop-flange e' up nearer to the dog, and this movement therefore of itself tends to the further compression of the spring.) Now it will be evident that so far as the pivotal action of the dog tends to produce the swinging of the lever E on the shaft such movement is due to the pressure which is sideward with respect to the telescoping parts F and E'. The spring being coiled between these parts, is to an extent pinched between them by such sideward pressure at the same time that it is being compressed axially, as described. The objectionable character of this feature is reduced to the minimum, however, by the location of the pivot $d$ in such relation to the parts that the initial movement as the dog is forced back is almost wholly in the direction to compress the spring and very slightly in a direction to carry sideward. In view, however, of this sideward pressure on the spring I find it advisable to extend the arm E' at the inner side of the barrel, so as to guard the spring on the side toward which it is carried and prevent its coils being caught at the end or corner of the tubular arm, as would be liable to happen if the spring were not thus guarded sideward over its whole length. Such guarded extension of the tubular arm E' is seen at $E^{10}$.

I do not limit myself to locating the spring between the two telescoping parts; but this arrangement tends to compactness, which under some circumstances is sufficient advantage to offset the slight disadvantage above pointed out in the pinching of the spring laterally between the telescoping parts.

I claim—

1. A safety-clutch comprising a cross-head fixed with respect to the driving-shaft, and a clutch-head fixed with respect to the driven shaft; a dog pivoted on the cross-head adapted to engage the clutch-head and to be rocked on its pivot out of such engagement; a lever having its fulcrum fixed with respect to the cross-head adapted to be actuated about its fulcrum by the dog when the latter is forced to disengaged position; a spring tending to resist the rocking of the dog to disengaged position; and a latch carried by the rotation of the driving-shaft adapted to be actuated by the clutch-head after the dog is disengaged, to lock the lever with respect to the cross-head.

2. A driving-clutch comprising, in combination with a cross-head fixed with respect to the driving-shaft and a clutch-head fixed with respect to the driven shaft; a pair of dogs pivoted at opposite ends of the cross-head and adapted to engage the clutch-head and to be rocked out of such engagement; springs tending to hold them engaged with the clutch-head; a lever fulcrumed about the shaft and adapted to be actuated by either of the dogs when the dog is forced to disengaged position; and a latch carried by the rotation of the driving-shaft and adapted to be actuated by the clutch-head after the dogs are disengaged to lock the lever with respect to the cross-head.

3. A driving-clutch comprising, in combination with a cross-head fixed with respect to the driving-shaft and the clutch-head fixed with respect to the driven shaft; a dog pivoted on the cross-head and a spring tending to hold it engaged with the clutch-head; said dog being adapted to be rocked on its pivot out of such engagement; a lever having its fulcrum fixed with respect to its cross-head pivoted to the heel of the dog, whereby the rocking of the dog on its pivot rocks the lever on its fulcrum; a latch carried with the cross-head in its rotation adapted to encounter the clutch-head after the dog is disengaged and to be thereby actuated with respect to the cross-head into position to lock the lever with respect thereto.

4. A driving-clutch comprising, in combination with a cross-head fixed with respect to the driving-shaft and the clutch-head fixed with respect to the driven shaft; a dog pivoted on the cross-head; a spring tending to hold it in engagement with the clutch-head, said dog being adapted to be rocked upon its pivot out of such engagement; a lever having its fulcrum fixed with respect to the cross-head and adapted to be actuated about its fulcrum by the dog when the latter rocks about its pivot; a latch pivoted on a cross-head and adapted to encounter the clutch-head after the dog is disengaged and to be thereby rocked about its pivot to position to lock the lever with respect to the cross-head.

5. A driving-clutch comprising, in combination with a cross-head fixed with respect to the driving-shaft and a clutch-head fixed with respect to the driven shaft; a dog pivoted to the cross-head and a spring tending to hold it in engagement with the clutch-head, said dog being adapted to be rocked on its pivot out of such engagement; a lever having an extensible or telescoping arm, the outer member of such lever being pivoted to the dog; a latch pivoted to the cross-head and adapted to encounter the clutch-head after the dog is disengaged, and be thereby rocked on its pivot to lock the lever with respect to the cross-head.

6. A driving-clutch comprising, in combination with a cross-head fixed with respect to the driving-shaft and a clutch-head fixed with respect to the driven shaft; a dog pivoted to the cross-head and adapted to engage the clutch-head and to be rocked on its pivot out of such engagement; a lever having its fulcrum fixed with respect to the cross-head and having an extensible or telescoping arm the outer member of which is pivoted to the dog; and a spring reacting between the members of said extensible arm, tending to extend the same and thereby to hold the dog in engagement with the clutch-head.

7. A driving-clutch comprising, in combination with a cross-head fixed with respect to the driving-shaft and a clutch-head fixed with respect to the driven shaft; a dog pivoted to the cross-head and adapted to engage the clutch-head and to be rocked on its pivot out of such engagement; a lever having its fulcrum fixed with respect to the cross-head and having an extensible or telescoping arm the outer member of which is pivoted to the dog; and a spring reacting between the members of said extensible arm, tending to extend the same and thereby to hold the dog in engagement with the clutch-head; a latch pivoted on a cross-head adapted to encounter the clutch-head after the dog is disengaged and to be thereby rocked to position to lock the telescoping arm with respect to the cross-head.

8. A driving-clutch comprising, in combination with a cross-head fixed with respect to the driving-shaft and a clutch-head fixed with respect to the driven shaft, a dog pivoted to the cross-head and adapted to engage the clutch-head and to be rocked on its pivot out of such engagement; a lever having its fulcrum fixed with respect to the cross-head comprising a tubular arm and a plunger telescoping therewith; the plunger being pivotally connected with the heel of the dog, and a spring interposed within the tubular arm and about the plunger and stopped at its ends against said parts respectively.

9. A driving-clutch comprising, in combination with a cross-head fixed with respect to the driving-shaft and a clutch-head fixed with respect to the driven shaft, a dog pivoted to the cross-head and adapted to engage the clutch-head and to be rocked on its pivot out of such engagement; a lever having its fulcrum fixed with respect to the cross-head comprising a tubular arm and a plunger telescoping therewith; the plunger being pivotally connected with the heel of the dog, and a spring interposed within the tubular arm and about the plunger and stopped at its ends against said parts respectively; the tubular arm of said lever having an extension $E^{10}$ to guard the spring at the inner side; substantially as set forth.

10. In combination with a cross-head fixed with respect to the driving-shaft and a clutch-head fixed with respect to the driven shaft; a dog pivoted to the cross-head adapted to engage the clutch-head and to be rocked out of such engagement; a spring tending to hold it in engagement; a lever having its fulcrum fixed with respect to the cross-head and adapted to be actuated about its fulcrum by the movement of the dog about its pivot; a latch operating between the lever and the cross-head, being pivoted to one of said parts and adapted to be stopped against the other; said lever having a projection adapted to encounter the clutch-head after the dog is disengaged whereby said latch is moved about its pivot into position to lock the lever with respect to the cross-head.

11. In combination with the cross-head fixed with respect to the driving-shaft and the clutch-head fixed with respect to the driven shaft; a dog pivoted to the cross-head and adapted to engage the clutch-head and to be rocked out of such engagement; a lever having its fulcrum fixed with respect to the cross-head and connected to the dog so that the rocking of the latter on its pivot rocks the lever on its fulcrum; a spring which tends to hold the dog in engaged position and which thereby holds the lever in corresponding position with respect to the cross-head; a latch operating between the lever and the cross-head, being fulcrumed to one of said parts and adapted to stop against the other and having a projection which encounters the clutch-head after the dog is disengaged, whereby the latch is forced to position to lock the lever and cross-head with respect to each other by the time the projection closes the clutch-head, the point of contact of the latch with the part against which it is stopped in the position to which it is positively forced by the encounter with the projection of the clutch-head, being such that the spring tends to carry the latch a little farther in the same direction about its pivot in which it was forced by said encounter; substantially as set forth.

In testimony whereof I have hereunto set my hand, in the presence of two witnesses, at Chicago, Illinois, this 11th day of November, 1895.

DE LONSON ELROY BARNARD.

Witnesses:
FRANK G. HOBART,
WILL A. GOSS.